(12) United States Patent
Mattox et al.

(10) Patent No.: US 8,135,930 B1
(45) Date of Patent: Mar. 13, 2012

(54) REPLICATION SYSTEMS AND METHODS FOR A VIRTUAL COMPUTING ENVIRONMENT

(75) Inventors: Jason Mattox, Spring Grove, IL (US); David Allen Feathergill, Woodstock, IL (US); Delano Xavier Afonso, Vernon Hills, IL (US); Jeremy Christopher Herman, Waukegan, IL (US); Thomas H. Bryant, III, Lakeway, TX (US)

(73) Assignee: Vizioncore, Inc., Buffalo Grove, IL (US)

( * ) Notice: Subject to any disclaimer, the term of this patent is extended or adjusted under 35 U.S.C. 154(b) by 441 days.

(21) Appl. No.: 12/502,035

(22) Filed: Jul. 13, 2009

Related U.S. Application Data (60) Provisional application No. 61/168,343, filed on Apr. 10, 2009, provisional application No. 61/085,745, filed on Aug. 1, 2008, provisional application No. 61/080,531, filed on Jul. 14, 2008.

(51) Int. Cl.
*G06F 12/00* (2006.01)
*G06F 13/00* (2006.01)

(52) U.S. Cl. ........ 711/162; 711/100; 711/154; 711/161; 711/203

(58) Field of Classification Search .................. 711/100, 711/154, 161, 162, 203
See application file for complete search history.

(56) References Cited

U.S. PATENT DOCUMENTS

| | | | |
|---|---|---|---|
| 4,130,867 A | 12/1978 | Bachman et al. | |
| 4,648,031 A | 3/1987 | Jenner | |
| 4,665,520 A | 5/1987 | Strom et al. | |
| 5,222,235 A | 6/1993 | Hintz et al. | |
| 5,297,279 A | 3/1994 | Bannon et al. | |
| 5,325,505 A | 6/1994 | Hoffecker et al. | |
| 5,333,314 A | 7/1994 | Masai et al. | |
| 5,414,650 A | 5/1995 | Hekhuis | |
| 5,422,979 A | 6/1995 | Eichfeld et al. | |
| 5,423,037 A | 6/1995 | Hvasshovd | |
| 5,455,945 A | 10/1995 | VanderDrift | |
| 5,530,855 A | 6/1996 | Satoh et al. | |
| 5,551,020 A | 8/1996 | Flax et al. | |
| 5,553,303 A | 9/1996 | Hayashi et al. | |
| 5,596,747 A | 1/1997 | Katabami et al. | |
| 5,634,052 A | 5/1997 | Morris | |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Tuan V. Thai
(74) *Attorney, Agent, or Firm* — Knobbe, Martens, Olson & Bear, LLP (57) ABSTRACT

Hybrid replication systems and methods for a virtual computing environment utilize snapshot rotation and differential replication. During snapshot rotation, data modifications intended for a source virtual machine disk (VMDK) are captured by a primary snapshot. Once a particular criterion is satisfied, the data modifications are redirected to a secondary snapshot while the primary snapshot is committed to both source and target VMDKs. The secondary snapshot is then promoted to primary, and a new secondary snapshot is created with writes redirected thereto. If the VMDKs become out-of-sync, disclosed systems can automatically perform a differential scan of the source data and send only the required changes to the target server. Once the two data sets are synchronized, snapshot replication can begin at the previously configured intervals. Certain systems further provide for planned failover copy operations and/or account for migration of a virtual machine during the copying of multiple VMDKs.

20 Claims, 6 Drawing Sheets

U.S. PATENT DOCUMENTS

| | | | |
|---|---|---|---|
| 5,640,561 A | 6/1997 | Satoh et al. | |
| 5,655,081 A | 8/1997 | Bonnell et al. | |
| 5,664,186 A * | 9/1997 | Bennett et al. | 1/1 |
| 5,721,915 A | 2/1998 | Sockut et al. | |
| 5,758,356 A | 5/1998 | Hara et al. | |
| 5,761,667 A | 6/1998 | Koeppen | |
| 5,761,677 A | 6/1998 | Senator et al. | |
| 5,774,717 A | 6/1998 | Porcaro | |
| 5,778,377 A | 7/1998 | Marlin et al. | |
| 5,778,392 A | 7/1998 | Stockman et al. | |
| 5,796,934 A | 8/1998 | Bhanot et al. | |
| 5,799,322 A | 8/1998 | Mosher, Jr. | |
| 5,822,780 A | 10/1998 | Schutzman | |
| 5,848,416 A | 12/1998 | Tikkanen | |
| 5,893,924 A | 4/1999 | Bahls et al. | |
| 5,933,818 A | 8/1999 | Kasravi et al. | |
| 5,933,820 A | 8/1999 | Beier et al. | |
| 5,940,832 A | 8/1999 | Hamada et al. | |
| 5,943,677 A | 8/1999 | Hicks | |
| 5,948,108 A | 9/1999 | Lu et al. | |
| 5,951,694 A | 9/1999 | Choquier et al. | |
| 5,951,695 A | 9/1999 | Kolovson | |
| 5,956,489 A | 9/1999 | San Andres et al. | |
| 5,956,504 A | 9/1999 | Jagadish et al. | |
| 5,978,594 A | 11/1999 | Bonnell et al. | |
| 5,983,239 A | 11/1999 | Cannon | |
| 5,990,810 A | 11/1999 | Williams | |
| 5,991,761 A | 11/1999 | Mahoney et al. | |
| 5,995,958 A | 11/1999 | Xu | |
| 6,003,022 A | 12/1999 | Eberhard et al. | |
| 6,016,497 A | 1/2000 | Suver | |
| 6,026,412 A | 2/2000 | Sockut et al. | |
| 6,029,195 A | 2/2000 | Herz | |
| 6,067,545 A | 5/2000 | Wolff | |
| 6,070,170 A | 5/2000 | Friske et al. | |
| 6,119,128 A | 9/2000 | Courter et al. | |
| 6,122,640 A | 9/2000 | Pereira | |
| 6,151,607 A | 11/2000 | Lomet | |
| 6,157,932 A | 12/2000 | Klein et al. | |
| 6,185,699 B1 | 2/2001 | Haderle et al. | |
| 6,243,715 B1 | 6/2001 | Bogantz et al. | |
| 6,253,212 B1 | 6/2001 | Loaiza et al. | |
| 6,289,357 B1 | 9/2001 | Parker | |
| 6,314,421 B1 | 11/2001 | Sharnoff et al. | |
| 6,343,296 B1 | 1/2002 | Lakhamraju et al. | |
| 6,363,387 B1 | 3/2002 | Ponnekanti et al. | |
| 6,411,964 B1 | 6/2002 | Iyer et al. | |
| 6,460,048 B1 | 10/2002 | Teng et al. | |
| 6,470,344 B1 | 10/2002 | Kothuri et al. | |
| 6,477,535 B1 | 11/2002 | Mirzadeh | |
| 6,499,039 B1 | 12/2002 | Venkatesh et al. | |
| 6,519,613 B1 | 2/2003 | Friske et al. | |
| 6,523,035 B1 | 2/2003 | Fleming et al. | |
| 6,584,474 B1 | 6/2003 | Pereira | |
| 6,606,626 B1 | 8/2003 | Ponnekanti | |
| 6,631,478 B1 | 10/2003 | Wang et al. | |
| 6,671,721 B1 | 12/2003 | Branson et al. | |
| 6,691,139 B2 | 2/2004 | Ganesh et al. | |
| 6,721,742 B1 | 4/2004 | Uceda-Sosa et al. | |
| 6,728,780 B1 | 4/2004 | Hebert | |
| 6,834,290 B1 | 12/2004 | Pugh et al. | |
| 6,859,889 B2 | 2/2005 | Matsuura et al. | |
| 6,907,512 B2 | 6/2005 | Hill et al. | |
| 6,950,834 B2 | 9/2005 | Huras et al. | |
| 6,959,441 B2 | 10/2005 | Moore | |
| 7,065,538 B2 | 6/2006 | Aronoff et al. | |
| 7,085,900 B2 | 8/2006 | Inagaki et al. | |
| 7,340,486 B1 | 3/2008 | Chapman | |
| 7,370,164 B1 | 5/2008 | Nagarkar et al. | |
| 7,447,854 B1 | 11/2008 | Cannon | |
| 7,461,103 B2 | 12/2008 | Aronoff et al. | |
| 7,546,325 B2 | 6/2009 | Kamei et al. | |
| 7,610,331 B1 | 10/2009 | Genske et al. | |
| 7,657,581 B2 * | 2/2010 | Orenstein et al. | 707/661 |
| 7,707,185 B1 | 4/2010 | Czezatke et al. | |
| 7,752,487 B1 | 7/2010 | Feeser et al. | |
| 7,765,400 B2 | 7/2010 | Costea et al. | |
| 7,805,423 B1 | 9/2010 | Romine et al. | |
| 7,844,577 B2 | 11/2010 | Becker et al. | |
| 7,849,267 B2 | 12/2010 | Lam et al. | |
| 7,895,161 B2 * | 2/2011 | Sugimoto et al. | 707/640 |
| 7,925,850 B1 * | 4/2011 | Waldspurger et al. | 711/162 |
| 2004/0236803 A1 | 11/2004 | Spiegeleer | |
| 2005/0114614 A1 | 5/2005 | Anderson et al. | |
| 2007/0208918 A1 | 9/2007 | Harbin et al. | |
| 2007/0244938 A1 | 10/2007 | Michael et al. | |
| 2008/0082593 A1 | 4/2008 | Komarov et al. | |
| 2008/0250406 A1 | 10/2008 | Carpenter et al. | |
| 2009/0007100 A1 | 1/2009 | Field et al. | |
| 2009/0089781 A1 | 4/2009 | Shingai et al. | |
| 2009/0216816 A1 | 8/2009 | Basler et al. | |
| 2009/0216970 A1 | 8/2009 | Basler et al. | |
| 2010/0049930 A1 | 2/2010 | Pershin et al. | |
| 2010/0070725 A1 | 3/2010 | Prahlad et al. | |
| 2010/0076934 A1 | 3/2010 | Pershin et al. | |
| 2010/0077165 A1 | 3/2010 | Lu et al. | |
| 2010/0262585 A1 | 10/2010 | Rosikiewicz et al. | |
| 2011/0047340 A1 | 2/2011 | Olson et al. | |

OTHER PUBLICATIONS

"The What, How and Where of Deduplication", Spectra nTier with FalconStor Deduplication, Spectra Logic Corporation, May 2008, in 12 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Computer Associates, "Platinum OnlineReorg Technical Overview, OnlineReorg", http://platinum.com/products/custstor/tsreorg.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorg.htm, 3 pages downloaded on Nov. 30, 1999.

EMC Deduplication Frequently Asked Questions, http://www.datadomain.com/resources/faq.html, downloaded Jun. 7, 2011, 4 pages.

Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.

Jeff Graves, "Partition Alignment", ORCS Web Team Blog, http://www.orcsweb.com/blog, Sep. 14, 2009, pp. 1-2.

Jin, Keren et al., "The Effectiveness of Deduplication on Virtual Machine Disk Images", SYSTOR 2009, May 2009, in 12 pages.

John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).

Joseph Pagano, paper on Microsoft Exchange Disaster Recovery Planning, document version 3.00, 1996, in 39 pages.

K. Loney, et al., "Oracle8i, DB Handbook," Oracle Press, 2000, p. 20.

L. Leverenz, et al., "Oracle8i Concepts," Oracle Corp., vol. 2, Release 8.1.5, 1999, p. 20-3.

Massiglia, Paul, "Block-Level Incremental Backup", VERITAS Software Corporation, Feb. 2000, in 13 pages.

Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMware, "Recommendations for Aligning VMFS Partitions", VMware Infrastructure 3, VMware Performance Study, Feb. 2009, pp. 1-10.

Vmware, Inc., "VMware Virtual Machine File System: Technical Overview and Best Practices", A VMware Technical White Paper, http://www.vmware.com/support/, 2007, Issue Version 1.0, pp. 1-19.

Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.

Kleo Bare Metal Backup, Wikipedia, retrieved from http://en.wikipedia.org/wiki/Kleo_Bare_Metal_Backup on Apr. 14, 2010, in 3 pages.

Veritas NetBackup for VMware Adminstrator's Guide, UNIX, Windows, and Linux, Release 6.5.4, Symantec Corporation, 2009, in 66 pages.

Data Sheet: Data Protection, "Symantec NetBackup 7, The Symantec NetBackup Platform: Complete protection for your information-driver enterprise," Symantec Corporation, Dec. 2009, in 8 pages.

Veeam Technology Overview, "The New Standard for Data Protection," Veeam Software, Apr. 2010, in 2 pages.

Backup Critic, "File Versus Image Backups," retrieved from http://www.backupcritic.com/software-buyer/file-verus-image on May 4, 2010, in 3 pages.

Microsoft TechNet, Windows Server 2003, retrieved from http://technet.microsoft.com/en-us/library/cc706993(WS.10,printer).aspx on Aug. 3, 2011, in 6 pages.

MSDN, Overview of Processing a Backup Under VSS, retrieved from http://msdn.microsoft.com/en-us/library/aa384589(d=printer,v=VS.85).aspx on Aug. 3, 2011, in 5 pages.

Feathergill, U.S. Appl. No. 12/182,364 Published 2010/0011178, filed Jul. 30, 2008, Systems and Methods for Performing Backup Operations of Virtual Machine Files.

Feathergill, U.S. Appl. No. 13/244,167, filed Sep. 23, 2011, Systems and Methods for Performing Backup Operations of Virtual Machine Files.

Afonso et al., U.S. Appl. No. 12/502,052, filed Jul. 13, 2009, Backup Systems and Methods for a Virtual Computing Environment.

Afonso et al., U.S. Appl. No. 13/244,187, filed Sep. 23, 2011, Backup Systems and Methods for a Virtual Computing Environment.

Feathergill et al., U.S. Appl. No. 12/566,231, filed Sep. 24, 2009, Systems and Methods for Data Management in a Virtual Computing Environment.

Jason Mattox, U.S. Appl. No. 12/762,162, filed Apr. 16, 2010, Block Status Mapping System for Reducing Virtual Machine Backup Storage.

Feathergill et al., U.S. Appl. No. 13/156,199, filed Jun. 8, 2011, Cataloging System for Image-Based Backup.

Feathergill et al., U.S. Appl. No. 13/218,362, filed Aug. 25, 2011, Multitier Deduplication Systems and Methods.

* cited by examiner

REPLICATION SYSTEMS AND METHODS FOR A VIRTUAL COMPUTING ENVIRONMENT

RELATED APPLICATIONS

This application claims the benefit of priority under 35 U.S.C. §119(e) of U.S. Provisional Patent Application No. 61/080,531, filed Jul. 14, 2008, U.S. Provisional Patent Application No. 61/085,745, filed Aug. 1, 2008, and U.S. Provisional Patent Application No. 61/168,343, filed Apr. 10, 2009, each of which is hereby incorporated herein by reference in its entirety to be considered part of this specification.

BACKGROUND

1. Field of the Invention

Embodiments of the invention relate to performing storage operations in a virtual environment and, in particular, to systems and methods for replicating data of one or more virtual machines.

2. Description of the Related Art

Many companies take advantage of virtualization solutions to consolidate several specialized physical servers and workstations into fewer servers running virtual machines. Each of these virtual machines can be configured with its own set of virtual hardware, such as a processor, memory, ports, and the like. In particular, a virtualization layer, or hypervisor, allocates the computing resources of one or more host servers to the virtual machines and further provides for isolation between such virtual machines.

Associated with each virtual machine is at least one virtual machine disk located on a datastore. This virtual machine disk can be copied, moved, archived or the like, such that certain vendors offer solutions that replicate virtual machine disks from a source datastore to a destination datastore. However, disruptions to replications systems during copying generally require the rebuilding of an entire replicated disk, which can consume a significant amount of time and processing resources.

SUMMARY

In view of the foregoing, a need exists for systems and methods that replicate data in a virtual computing environment, while efficiently responding to unanticipated disruptions and/or out-of-sync conditions that may occur. Moreover, there is a need for systems and methods that track and/or account for migration of virtual machines during replication, backup or other data operations.

For example, systems and methods are disclosed herein for performing hybrid replication in a virtual computing environment by using a combination of two different replication methods: differential replication and snapshot rotation. During snapshot rotation, data modifications intended for a source server are captured by an open snapshot for, for example, a user-configured interval. Once that interval is reached, the data modifications are then redirected to a secondary snapshot while the primary snapshot is committed to both the source and target servers. At the next replication pass, the secondary snapshot is promoted to primary and sent to the target server. A new secondary snapshot is created, and writes are again redirected thereto. Embodiments of this method can allow for a faster replication process, in part, because no scanning of the datastores is required.

This snapshot rotation process can continue as long as the source and target virtual machine data remain synchronized. If the data becomes out-of-sync, embodiments of the invention can automatically perform a differential scan of the source data and send only the required changes to the target server. Once the two data sets are synchronized, snapshot replication can begin at the previously configured intervals.

In particular, in certain embodiments, a method for replicating a virtual machine disk is disclosed. The method comprises creating a first snapshot of source virtual machine disk and identifying an out-of-sync condition between the source virtual machine disk and corresponding replication data of a target virtual machine disk. The method further comprises creating a signature file associated with the replication data, comparing the target's signature with a signature file created on-the-fly with respect to the data of the source virtual machine disk, and identifying during the block-by-block comparison unmatched blocks between the source virtual machine disk and the target virtual machine disk.

For each of the unmatched blocks, the method further includes transmitting a copy of the particular data block from the source to the target virtual machine disk. Following resynchronization of the source and target, a second snapshot is created with respect to the source virtual machine data, and the first snapshot is committed to both the source and target. The second snapshot then houses changes directed to the source virtual machine disk for a particular period of time and/or until the snapshot reaches a particular size. This snapshot rotation process following the resynchronization can be repeated to replicate changes to the data until a new out-of-sync condition is detected.

Moreover, certain systems and methods disclosed herein can be used in addressing problems that arise when the location of a virtual machine changes during a copy operation involving multiple virtual machine disks, such as during replication, backup, archive, recovery or other like operations. In particular, certain embodiments of the invention address the copying of data to or from a plurality of virtual machine disks in a shared storage environment.

In certain embodiments, a method is disclosed for replicating virtual machine data. The method comprises creating a first snapshot of one or more source virtual machine disks on a source storage device, wherein the one or more source virtual machine disks comprises a plurality of source data blocks, and detecting an out-of-sync condition between the one or more source virtual machine disks and one or more replicated virtual machine disks, the one or more replicated virtual machine disks comprising a plurality of target data blocks corresponding to the plurality of source data blocks. Following said detecting, the method comprises generating a target signature for each of the plurality of target data blocks of the one or more replicated virtual machine disks, wherein each target signature is indicative of data content of the particular target data block and storing each target signature in a target signature file.

For each of the plurality of source data blocks, the method further comprises generating a source signature indicative of data content of the particular source data block, comparing the source signature of the particular source data block with the target signature of the corresponding target data block, and updating the one or more replicated virtual machine disks with a copy of the particular source data block when the source signature does not match the target signature. The method also includes creating a second snapshot of the one or more source virtual machine disks; and committing the first snapshot to both the one or more source virtual machine disks and the one or more replicated virtual machine disks.

In certain embodiments, a method is disclosed for replicating virtual machine data. The method includes copying data from a source virtual machine disk to a target virtual machine disk by repeatedly alternating acts of: (i) creating a new snapshot of the source virtual machine disk, and (ii) committing a previously existing snapshot of the source virtual machine disk to both the source and target virtual machine disks until an out-of-sync condition is detected between the source and target virtual machine disks, the new snapshot capturing data modifications intended to be made to the source virtual machine disk during said committing. The method further comprises creating a second snapshot of the source virtual machine disk and comparing a source signature for each of a plurality of source data blocks of the source virtual machine disk with a target signature of a corresponding target data block of the target virtual machine disk. The method also includes updating the target virtual machine disk with a copy of each source data block whose source signature does not match the target signature of the corresponding target data block; creating a third snapshot of the source virtual machine disk; and committing the second snapshot to both the source and target virtual machine disks, wherein the second snapshot captures data modifications intended to be made to the source virtual machine disk during said comparing and updating.

In certain embodiments, a system is disclosed for replicating virtual machine data. The system includes a source system, a target system and a replication module. The source system includes a source virtual machine executing on a source host server, a source datastore in communication with the source virtual machine, and a source virtual machine disk stored on the source datastore and comprising data of the source virtual machine as a plurality of first data blocks. The target system includes a target datastore, and a target virtual machine disk stored on the target datastore and comprising data of a target virtual machine as a plurality of second data blocks.

The replication module includes is in network communication with the source system and the target system to replicate data from the source virtual machine disk to the target virtual machine disk. Moreover, the replication module is further programmed to repeat acts of instructing a creation of a new snapshot of the source virtual machine disk and instructing a commit of a previously existing snapshot to both the source and target virtual machine disks until an out-of-sync condition is detected between the source and target virtual machine disks, and following detecting of the out-of-sync condition: (i) compare first signatures for each of the plurality of first data blocks with second signatures of corresponding ones of the plurality of second data blocks to identify unmatched data blocks between the source and target virtual machine disks, and (ii) update the target virtual machine disk with a copy of each first data block that does not match the corresponding second data block.

In certain embodiments, a system is disclosed for replicating virtual machine data. The system includes means for creating a first snapshot of one or more source virtual machine disks on a source storage device, wherein the one or more source virtual machine disks comprises a plurality of source data blocks; means for detecting an out-of-sync condition between the one or more source virtual machine disks and one or more replicated virtual machine disks, the one or more replicated virtual machine disks comprising a plurality of target data blocks corresponding to the plurality of source data blocks; means for generating a target signature for each of the plurality of target data blocks of the one or more replicated virtual machine disks, wherein each target signature is indicative of data content of the corresponding target data block, wherein said generating means is further configured to generate a source signature for each of the plurality of source data blocks; means for comparing the source signature of each source data block with the target signature of the corresponding target data block; means for updating the one or more replicated virtual machine disks with a copy of the source data block when the source signature of the source data block does not match the target signature of the corresponding target data block; and means for committing the first snapshot to both the one or more source and replicated virtual machine disks.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Embodiments of the invention disclosed herein include replication systems and methods for use in a virtual computing environment. For instance, certain embodiments provide for replication of one or more virtual machines, including, for example, configuration settings, operating system patches, applications, application data, and/or other operating system level changes. Such replication systems can advantageously account for out-of-sync conditions that may occur between the source and replicated data.

For instance, embodiments of the invention can perform a hybrid replication process that includes snapshot rotation and differential replication. In one example, the replication process includes performing snapshot rotation to replicate data between a source, or primary, virtual machine (e.g., a virtual machine disk) and a target, or destination, virtual machine. When an out-of-sync condition is identified between the two virtual machines, a differential engine identifies the unmatched blocks and updates the data of the source and/or target virtual machine(s). Following resynchronization, snapshot rotation replication is recommenced until a new out-of-sync condition is detected.

In certain embodiments, hybrid replication advantageously provides for a more robust and efficient replication process for virtual machine data. For instance, during periods of snapshot rotation replication, no scanning of the source or target data is required. Moreover, at least a portion of the replication process can be controlled by a replication server, such as through injecting one or more replication processes for execution on the source and/or target virtual machines. The replication of data can further be performed from multiple hosts to a single host, different hardware platforms, and/or from a single host to multiple hosts. Moreover, certain embodiments of the invention can utilize a shadow copy service to temporarily quiesce virtual machine applications to provide a transactionally consistent database for replication.

In certain embodiments, the hybrid replication systems and methods utilize a differential engine to synchronize either or both of the source or target files (e.g., virtual machine disk(s)). For instance, the differential engine can back up only the changed data blocks since a last full backup, thereby reducing the size of the backup files on disk.

Moreover, certain systems and methods disclosed herein can be used in addressing problems that arise when the location of a virtual machine changes during the copying of data on multiple virtual machine disks, such as during replication, backup, archive, recovery or other like operations. In particular, certain embodiments of the invention address the copying of data to or from a plurality of virtual machine disks in a shared storage environment.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

For exemplary purposes, certain embodiments of the inventive systems and methods will be described with reference to VMWARE virtual infrastructures offered by VMware Inc. (Palo Alto, Calif.). However, it will be understood from the disclosure herein that the disclosed systems and methods can be utilized with other virtualization technologies, including, but not limited to, virtual environments using XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

Figure 1:
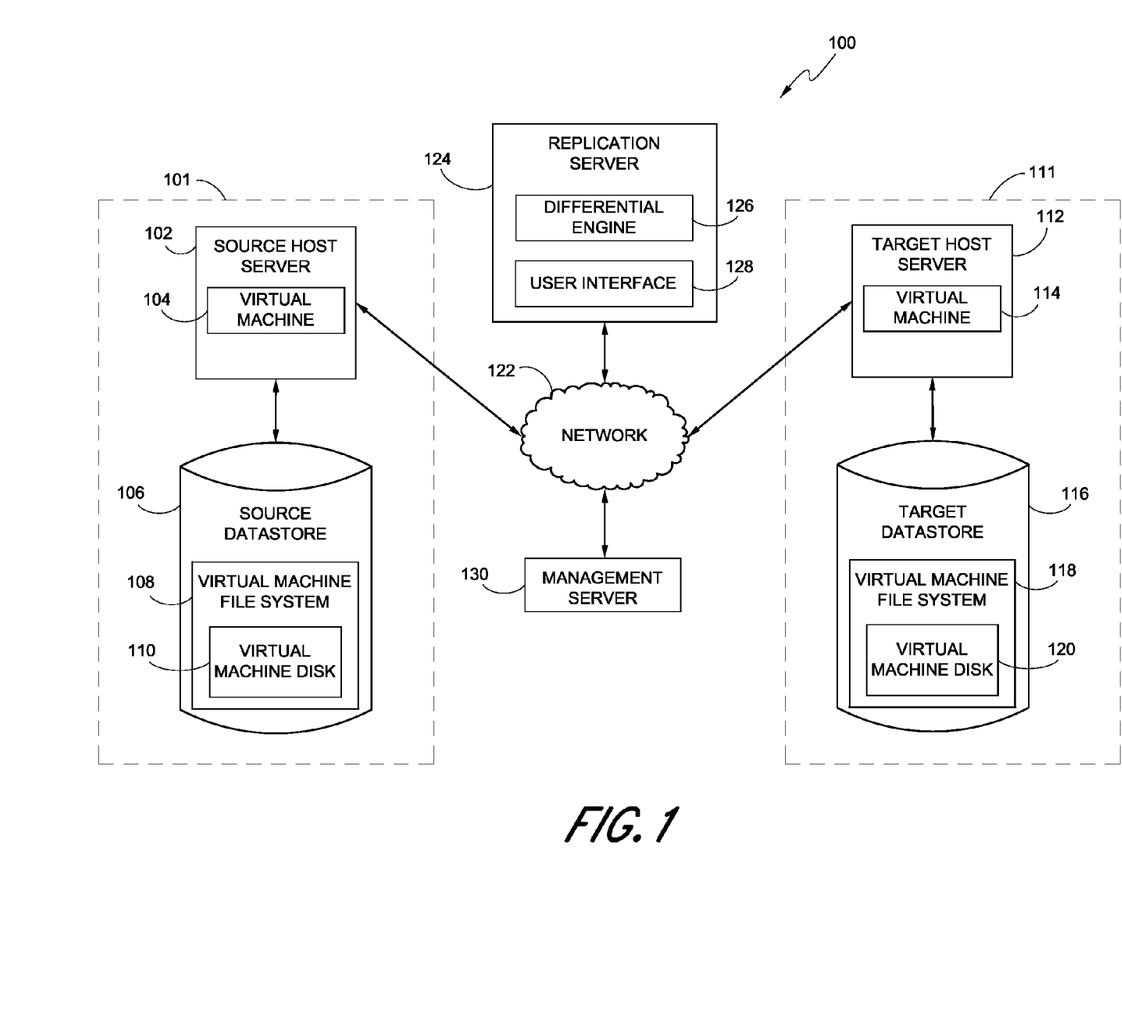
FIG. 1 illustrates an exemplary block diagram of a system for performing data replication in a virtual computing environment, according to certain embodiments of the invention.

FIG. 1 illustrates an exemplary block diagram of a system for performing data replication in a virtual computing environment 100, according to certain embodiments of the invention. In general, the virtual computing environment 100 is advantageously configured to replicate virtual machine disk data from a source (primary) system 101 to a target (destination) system 111. For example, the virtual computing environment 100 can perform replication of one or more virtual machine disks, while also reconciling any differences that may result when such virtual machine disks become out-of-sync.

As illustrated, the source system 101 comprises a source host server 102 hosting one or more virtual machines 104. For ease of explanation, only a single virtual machine will be described with reference to the source system 101. However, it will be understood from the disclosure herein that embodiments of the invention can include multiple virtual machines operating on one or more host servers.

The source host server 102 communicates with a source datastore 106 to interact with a virtual machine file system (VMFS) 108 storing information related to the virtual machine 104. In particular, the VMFS 108 further comprises a virtual machine disk (VMDK) 110 that includes the virtual hard drive for the virtual machine 104. The VMFS 108 can further include configuration data (e.g., .VMX files), file partition data, and/or other data related to virtual machine 104 and/or source host server 102.

The target system 111 comprises a target host server 112 hosting one or more virtual machines 114. As with the source host server 102, only a single virtual machine will be described hereinafter with reference to the target host server 112. In certain embodiments, the target virtual machine 114 is generally in a powered off state such that no applications are actively executing thereon to modify data of the target VMDK 120.

The target host server 112 is in communication with a target datastore 116 including a VMFS 118 that stores information related to the virtual machine 114. In particular, the VMFS 118 further comprises a VMDK 120 that includes data associated with the target virtual machine 114. The VMFS 118 can further include configuration data, file partition data, and/or other data related to virtual machine 114.

In certain embodiments, either or both of the host servers 102, 112 can comprise one or more computing devices configured to host one or more virtual machines executing above a hypervisor layer. In certain embodiments, the hypervisor is configured to decouple the physical hardware of the host server from the operating system(s) of the virtual machine(s). For instance, either or both of the host servers 102, 112 can comprise an ESX server or other like virtualization platform provided by VMware Inc. Such abstraction allows, for example, for multiple virtual machines with heterogeneous operating systems and applications to run in isolation on the same physical machine.

In yet other embodiments, either or both of the host servers 102, 112 can include a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

As illustrated, the source host server 102 and the target host server 112 communicate with each other via a network 122. In certain embodiments, the network 122 can comprise a local area network (LAN). In yet other embodiments, the network 122 can comprise one or more of the following communication means: internet, intranet, wide area network (WAN), public network, combinations of the same or the like. In addition, connectivity to the network 122 may be through, for example, remote modem, Ethernet, token ring, fiber distributed datalink interface (FDDI), asynchronous transfer mode (ATM), combinations of the same or the like. In certain embodiments, the network 122 is advantageously configured to support secure shell (SSH) tunneling or other protocol connections for the transfer of data between the source system 101 and the target system 111.

Also coupled to the network 122 is a replication server 124 configured to manage the replication of virtual machine data from the source system 101 to the target system 111. In certain embodiments, the replication server 124 comprises a WINDOWS-based computing device. In yet other embodiments, the replication server 124 comprises a LINUX-based server, an ESX server, combinations of the same or the like.

The illustrated replication server 124 comprises a differential engine 126 configured to perform differential replication and reconcile data discrepancies between the source system 101 and the target system 111. For instance, in certain embodiments, the differential engine 126 comprises a signature generator and/or comparison module that creates and compares digital signatures of data blocks of the source and target datastores 106, 116 to identify any corresponding data blocks that differ in their actual data.

The replication server 124 can be further configured to load the differential engine 126, or specific components thereof, onto the source host server 102 and/or target host server 112 via binary injection, such as described in U.S. Provisional Patent Application No. 61/100,182, filed Sep. 25, 2008, and entitled SYSTEMS AND METHODS FOR BINARY INJECTION IN A VIRTUAL COMPUTING ENVIRONMENT, the entirety of which is hereby incorporated herein by reference to be considered part of this specification. Such injection processes allow for the virtual machines 104, 114 of the host servers 102, 112 to execute one or more functions of the differential engine 126 as described in more detail below.

The replication server 124 further includes a user interface 128 for displaying to, and/or receiving from, a user information relating to storage operations of the replication server 124. In certain embodiments, the user interface 128 causes the display of one or more windows for obtaining user input and/or outputting status information with respect to replication processes occurring in the virtual computing environment 100.

Although the replication server 124 has been described herein with respect to a physical machine, in other embodiments of the invention the replication server 124 can be executed on one or more virtual machines. Moreover, other embodiments of the replication server 124 can function without one or more of the components illustrated in FIG. 1. In yet other embodiments, the replication server 124 can communicate directly with either or both of the datastores 106, 116 (e.g., via a fiber switch) without needing to access the data though the host servers 102, 112. In yet other embodiments, intended changes to VMDK data can be identified through change backtracking rather than, or in addition to, using snapshots in snapshot rotation.

Each of the host servers 102, 112 also communicates with a management server 130 through the network 122. In certain embodiments, the management server 130 directs general operation of the host servers 102, 112 and/or their hosted virtual machines. For example, the management server 130 can comprise a VMWARE VirtualCenter management server that provides a centralized management module for the virtual environment, such as a VMWARE Infrastructure 3 (VI3) environment or the like.

Figure 2:
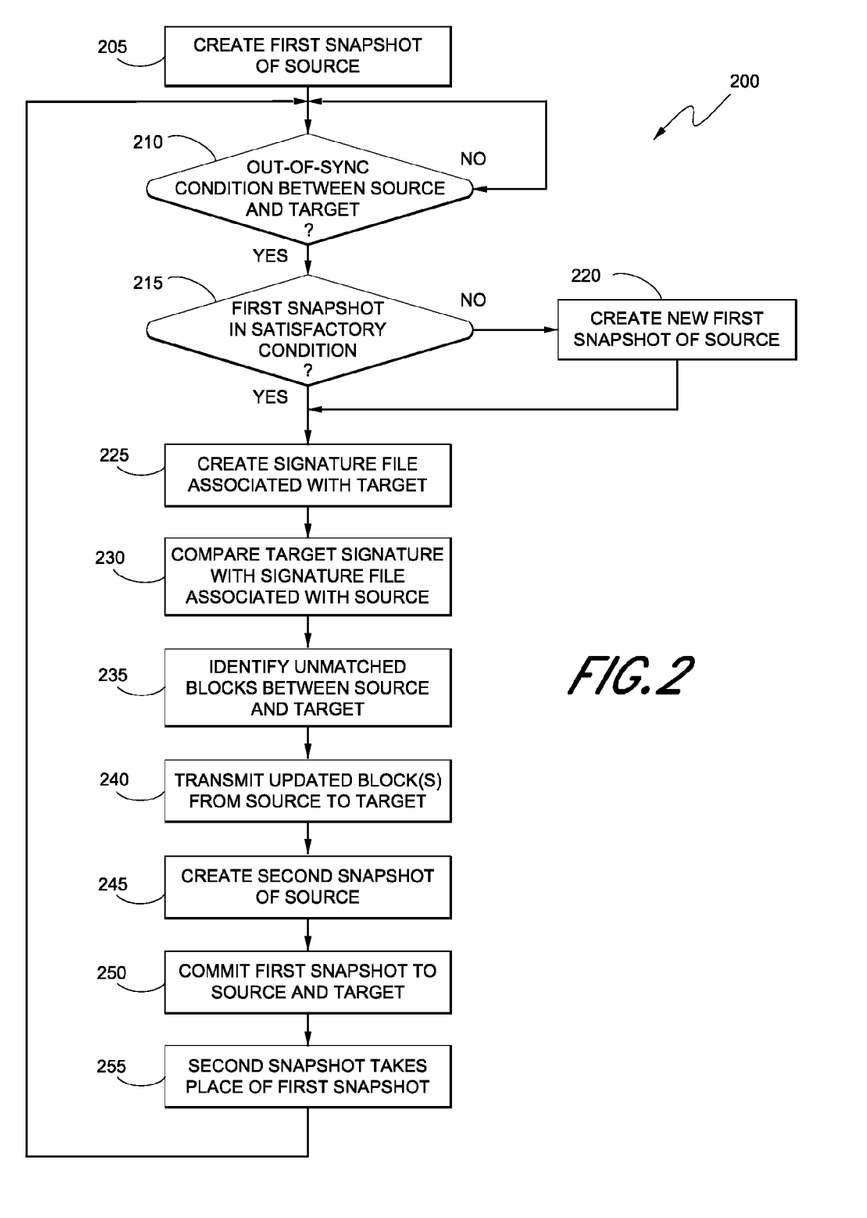
FIG. 2 illustrates a flowchart of an exemplary embodiment of a replication process usable by the replication system of FIG. 1.

FIG. 2 illustrates a flowchart of an exemplary embodiment of a replication process 200 usable in the virtual computing environment 100 of FIG. 1. For instance, the replication process 200 can maintain a replicated copy of virtual machine data and account for out-of-sync disruptions without requiring the recopying of the entire source virtual machine. For exemplary purposes, the replication process 200 will be described herein with reference to the components of the virtual computing environment 100 based on a VMWARE virtual infrastructure.

In certain embodiments, the replication process 200 comprises a hybrid replication process that utilizes both snapshot rotation and differential replication. For instance, with snapshot rotation, the replication process 200 creates and maintains a replication copy of virtual machine data through the use of multiple snapshots to alternatively record and apply writes to multiple VMDKs. The differential replication process is then used to address situations when the source and target VMDKs become unsynchronized.

With reference to FIG. 2, at Block 205, the replication server 124 opens a first snapshot of virtual machine data on the source system 101, such as the VMDK 110. In certain embodiments, the first snapshot is configured to record changes intended to be made to the data of the VMDK 110. For example, the replication server 124 can instruct a hypervisor of the virtual machine 104 to create a snapshot of the one or more VMDKs 110 in order to record changes intended to such data during a particular period of time. Moreover, the creation of the snapshot enables the source VMDK 110 to be opened for read-only access such that the virtual machine data can be replicated without changes being applied thereto.

In certain embodiments, the replication server 124 coordinates with the hypervisor of the host computer to open an external, hypervisor snapshot on the source datastore 106 to redirect and/or queue writes requested by applications on the virtual machine 104. For instance, in embodiments wherein the hypervisor comprises an ESX server platform, the replication server 124 can instruct the hypervisor via a VMsnap command to create a hypervisor snapshot of the VMDK 110. Moreover, because the hypervisor can advantageously coordinate the snapshot functions from outside the guest operating system of the virtual machine 104, a complete and consistent image of the entire VMDK 110 is able to be obtained without powering down the virtual machine 104.

In certain embodiments, Block 205 reflects part of a default snapshot rotation process used for data replication between the source system 101 and the target system 111. In general snapshot rotation, one snapshot is used to capture writes intended for the source VMDK 110, while another snapshot that had captured previous writes is concurrently, or substantially concurrently, merged into both the source and target VMDKs 110, 120. The open snapshot is then closed, such as after a user-configured interval (e.g., fifteen minutes) and/or when the snapshot reaches a particular size, while another snapshot is opened to record a new round of changes, and the replication process is repeated to keep the data of the source and target systems 101, 111 synchronized.

However, in certain circumstances, the snapshot rotation process can be interrupted, thereby resulting in the data of the source and target systems 101, 111 being out-of-sync. For instance, such an out-of-sync condition can occur when a snapshot housing the changes to VMDK 110 is deleted or prematurely committed or closed. In yet other embodiments, an out-of-sync condition can occur when a user powers on the target virtual machine 114, thereby causing a discrepancy in the time/date stamp information between the source and target systems 101, 111. In yet other embodiments, the out-of-sync condition can arise when a partial commit of a snapshot is performed, an application programming interface (API) error occurs during committal, a severance in communication between the source and target systems 101, 111, or the like. Each of these situations can result in the virtual machine data of the source system 101 being more current than the replicated data of the target system 111, or vice versa.

At Block 210, the replication process 200 monitors for an out-of-sync condition between the source and target systems. For instance, the replication server 124 can communicate with either or both of the source and target systems 101, 111 to determine if data thereon is out-of-sync. In certain embodiments, the replication server 124 retrieves information from the target host server 112 to parse the CID field of a header of the source and/or target VMDKs 110, 120 to see if it has changed, thereby indicating that modification(s) have been made to the VMDKs. In particular, the replication server 124 can compare a copy of the CID field recorded from the previous replication pass with the current CID field to determine if any premature or unintended changes have been made to the particular VMDK.

In yet other embodiments, the replication server 124 can communicate with the management server 130 to determine an out-of-sync condition. In certain embodiments, such monitoring can also comprise receiving input from a user/administrator that the source and target data are out-of-sync. In yet other embodiments, date/time stamp information can be used to identify when either VMDK has been changed prematurely. Moreover, in other embodiments, the replication server 124 can access a data structure associated with the target VMDK 120 that maintains a record of recently changed data blocks or files.

When an out-of-sync condition is detected, the replication process 200 determines if the first snapshot remains in a satisfactory condition for replication purposes (Block 215). For instance, if the snapshot has continued in its normal operation of capturing writes intended to be made to the source VMDK 110, notwithstanding the out-of-sync-condition, the first snapshot may be considered to be in a satisfactory condition. In certain embodiments, this is determined by comparing date/time stamp information, verifying that a proper naming convention is used with the snapshot, analyzing a creation time, combinations of the same or the like.

If the first snapshot is not satisfactory (e.g., has been deleted or prematurely committed), the replication process 200 proceeds to Block 220 to create a new first snapshot. In situations where the first snapshot still exists but is deemed unsatisfactory, the existing first snapshot can be deleted or removed prior to the creation of the new first snapshot.

Upon creation of the new first snapshot, or if at Block 215, the first snapshot is in a satisfactory condition, the replication process 200 proceeds with Block 225 to create a signature file associated with the target virtual machine data. In certain embodiments, the target signature file comprises a signature of each data block of the VMDK 120, wherein the signature is based on the data content of the data block.

In certain embodiments, the differential engine 126 of the replication server 124 scans the entire target VMDK 120 and computes and stores in the signature file MD4/SHA-1 signatures for each 256 KB data block. In yet other embodiments, the differential engine 126 can generate the signature file using other types of message digest algorithms, cryptographic hash functions, (digital) fingerprints, checksums, hash values, combinations of the same or the like. Moreover, the signatures can be calculated for block sizes other than 256 KB, such as smaller or larger data block sizes.

At Block 230, the differential engine 126 scans the source VMDK 110 and generates a signature for each of the data blocks thereof. The differential engine 126 further compares the source and target signatures of the corresponding data blocks of the source and target VMDKs 110, 120. In certain embodiments, the comparison is advantageously performed as each signature is computed on-the-fly for each 256 KB data block on the source VMDK 110 without waiting for all the source signatures to be generated.

Based on these comparisons, the differential engine 126 identifies each unmatched data block between the source and target systems (Block 235). Generally, the unmatched blocks reflect those data blocks that were updated on the source datastore 106 (e.g., via a premature committing of a snapshot) but not on the target datastore 116, or vice versa.

At Block 240, the replication process 200 transmits the updated data blocks from the source datastore 106 to the target datastore 116. For instance, in certain embodiments, the source system 101 transmits the updated data blocks via a SSH connection with the target system 111 through the network 122. To expedite the differential replication process, the transmitting of the data blocks during Block 240 can advantageously occur in parallel, or substantially in parallel, with the acts of Blocks 230 and 235.

In certain further embodiments, when the data blocks of the target VMDK 120 are replaced with the updated data blocks, the overwritten blocks can be copied to disk as an undo file (e.g., via inverse differential process). This advantageously allows for the overwritten blocks to be merged back into the target VMDK 120 if the synchronization process is further disrupted.

Once the updated data blocks have been sent to the target system 111, the source VMDK 110 and the target VMDK 120 are presumably re-synchronized. At that point, the replication process 200 resumes the default snapshot rotation process. Thus, at Block 245, the replication process 200 creates a second snapshot of the source VMDK 110 (Block 235), and the first snapshot, which has been handling writes during the differential replication process, is closed and merged into both the source and target VMDKs 110, 120 (Block 250). The second snapshot then becomes the first, or primary, snapshot (Block 255), and the replication process returns to Block 210.

In certain embodiments of the invention, one or more blocks of the replication process' 200 can advantageously be performed using binary injection techniques. For example, the replication server 124 can include one or more binary files that can be injected into the source and/or target host servers 102, 112 to perform one or more functions relating to the replication of the virtual machine files.

Figure 3:
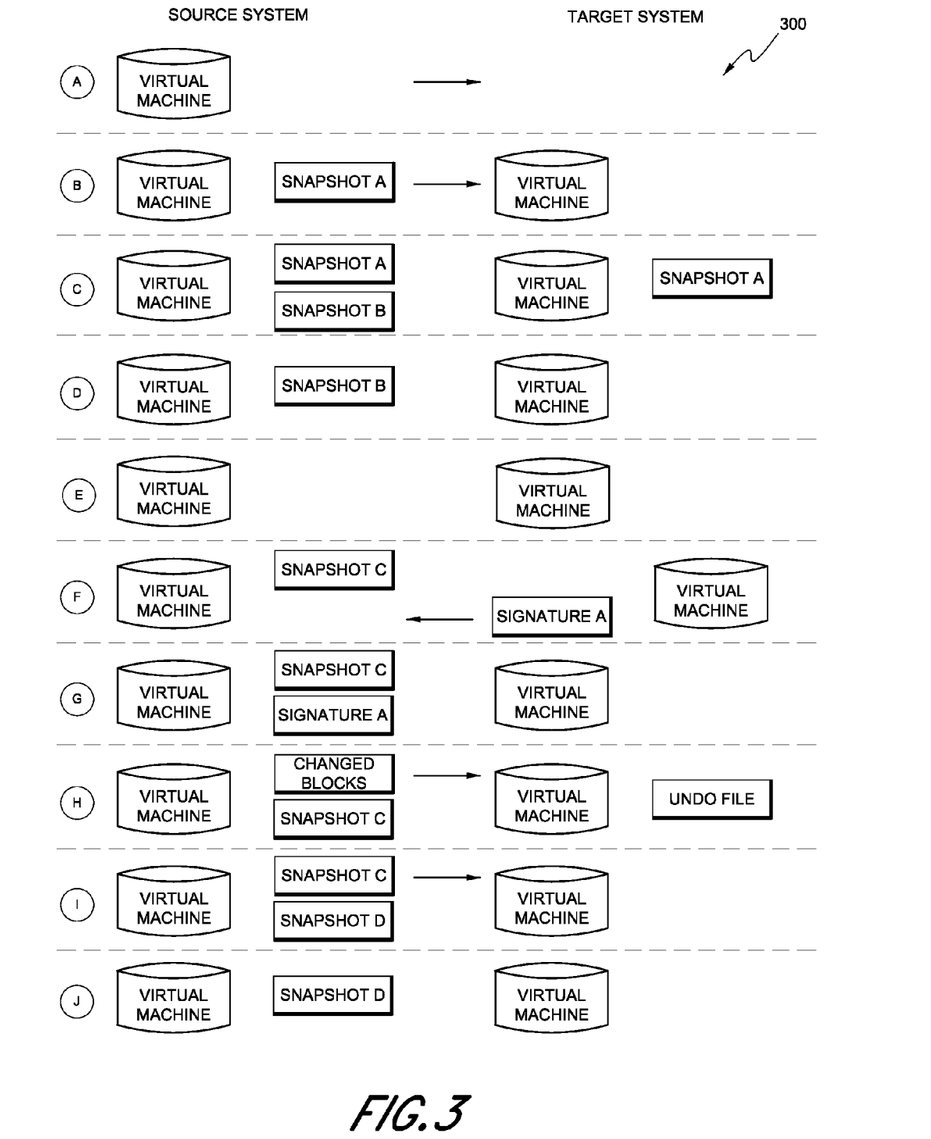
FIG. 3 illustrates a timeline of states of data during the replication process of FIG. 2, according to certain embodiments of the invention.

FIG. 3 illustrates an exemplary timeline 300 of states of data during the replication process 200 of FIG. 2, according to certain embodiments of the invention. In particular, the timeline 300 includes a simplified representation of the states of data on a source system (e.g., source datastore 106) and a target system (e.g., target datastore 116) during replication in a virtual computing environment. For exemplary purposes, the states of the timeline 300 will be described herein with reference to the components of the virtual computing environment 100 of FIG. 1.

As shown at State A, the entire virtual machine 104 of the source system 101 is initially replicated to the target system 111. More particularly, in certain embodiments, the VMDK 110 stored on the source datastore 106, which holds the data of the virtual machine 104, is replicated to the target system 111 such that an identical, offline, virtual machine 114 is housed on the target host server 112.

At State B, a snapshot rotation process is initiated to maintain data consistency between the source and target VMDKs 110, 120. In particular, a snapshot A is opened with respect to the source VMDK 110 to house changes intended to be made to the data of the source VMDK 110 by applications executing on the virtual machine 104.

At State C, when the changes housed by snapshot A are to be applied to the VMDKs, a second snapshot (i.e., snapshot B) is opened with respect to the VMDK 110. Snapshot A is also closed and a copy is sent to the target system 111 (e.g., via an SSH communication path) so that the changes housed therein are applied to both the source and target VMDKs 110,

120 (State D). For instance, writes captured by snapshot A during snapshot rotation may be applied after a predetermined period of time, after a threshold size of the snapshot is attained (e.g., 16 MB), and/or in response to a user command.

At State E, snapshot B is prematurely committed and merged into the source VMDK 110, thereby resulting in data of the source system 101 and the target system 111 being out-of-sync. That is, the data of the source VMDK 110 includes changes not yet applied to the data of the target VMDK 120.

At State F, snapshot C is created with respect to the source VMDK 110, which locks the source VMDK 110 from further data modification. Also, the differential engine 126 of the replication server 124 computes and stores signatures for the data blocks on the target VMDK 120 in a signature file A. As discussed above, in certain embodiments, the signatures are computed using an MD4-SHA 1 algorithm for each 256 KB data block on the target VMDK 120. Once the scan of the target VMDK 120 is complete, a copy of the signature file A is sent to the source system 101.

At State G, the differential engine 126 computes signatures for each of the data blocks on the source VMDK 110. As each signature is generated, the differential engine 126 compares the newly-generated signature of the source data block with a signature in signature file A that is associated with the corresponding target data block to determine if the data of the blocks differ. As discussed above, this comparison is advantageously performed as each signature for the source system data is generated rather than waiting until a full scan of the source VMDK 110 has been completed.

At State H, for each unmatched block that is identified by the comparison of the signatures, the source system 101 transmits a copy of the particular source data block to be written to the target VMDK 120. Moreover, those data blocks on the target VMDK 120 that are overwritten can be, in turn, stored in an undo file in the event that the differential replication process is disrupted prior to completion.

At State I, the source and target systems 101, 111 resume the default snapshot rotation replication by opening a snapshot D for the source VMDK 110 and merging the writes captured by snapshot C into both the source and target VMDKs 110, 120. State J illustrates snapshot D continuing to house changes intended to be made to the source VMDK 110 until replication is again requested.

Although certain embodiments of the invention have been described with respect to particular arrangements, it will be understood from the disclosure herein that alternative embodiments can be used. For instance, certain embodiments of the invention can further utilize a shadow copy process, such as for example Volume Shadow Copy Service (VSS) offered by Microsoft Corporation, to alternately freeze and thaw application writes of the source virtual machine 104 in order to provide a transitionally consistent image for replication. In such embodiments, the method allows for synchronization of volume shadow copy services with external snapshot capabilities (e.g., hypervisor snapshots).

In yet other embodiments, in place of hypervisor snapshots, systems and methods disclosed herein can utilize a ΔVMDK file, a .REDO log, or like data structure, for housing changes directed to the source VMDK 110 during replication.

Moreover, in other embodiments of the invention, the management server 130, hypervisors, and/or virtual machines can maintain a list or other record of updated blocks on a particular datastore. In such embodiments, the differential engine 126 need not compute and compare signatures between data blocks on different datastores to identify differences therebetween. Rather, the replication server 124 can access the record(s) maintained by the management server 130, source system 101 and/or target system 111 to determine which data blocks have been modified over a particular period of time.

Figure 4:
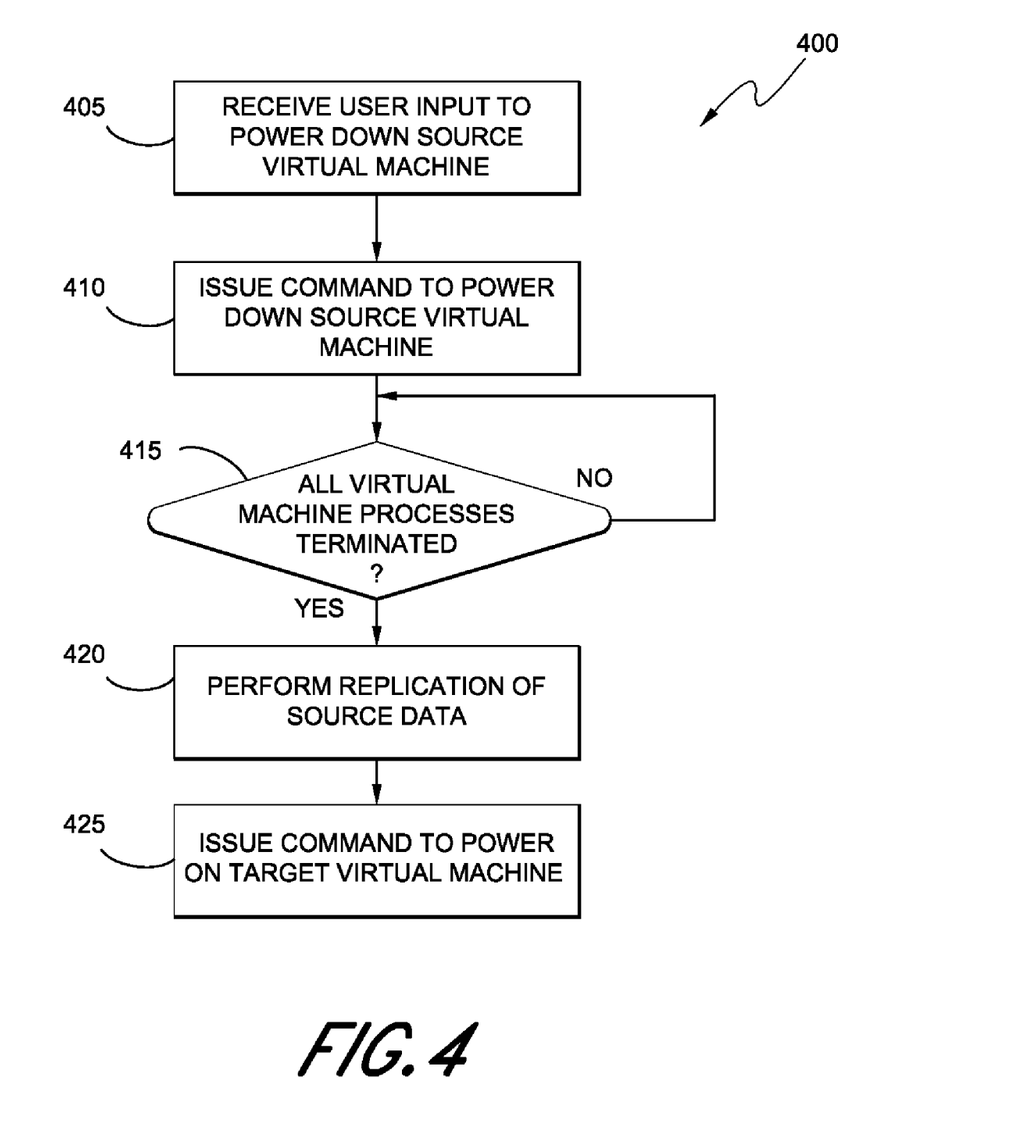
FIG. 4 illustrates a flowchart of an exemplary embodiment of a failover process that provides for replication of data in a consistent state.

FIG. 4 illustrates a flowchart of an exemplary embodiment of a failover process 400 that provides for replicated data to be in a consistent state. In general, the failover process 400 includes powering off a virtual machine prior to replicating, migrating or otherwise copying the virtual machine data to a destination location. For exemplary purposes, the failover process 400 will be described herein with reference to the components of the virtual computing environment 100.

At Block 405, the failover process 400 receives user input to power down the source virtual machine 104. In certain embodiments, the user input is obtained through the user interface module 128 of the replication server 124. For instance, a user can select a check box or make another like indication through a user interface that the user desires to perform a planned failover replication operation by powering down the virtual machine 104.

At Block 410, the replication server 124 issues a command to the source host server 102 to power down the virtual machine 104. In certain embodiments, the command comprises an API call to the hypervisor of the source host server 102 to power down the virtual machine 104. For example, in a VMware virtual computing environment, the API call can comprise a PowerOffVM_Task command to the ESX host server to power down the virtual machine 104.

At Block 415, the failover process 400 awaits the termination of all processes related to operation of the source virtual machine 104. For instance, the failover process 400 can verify that applications of the virtual machine 104 are not running in memory and that associated threads, data write operations, or other requests related thereto have concluded.

Once all the virtual machine processes have terminated and the virtual machine 104 is in a powered off state, the failover process 400 continues with replication of the virtual machine data, such as replication of the source VMDK 110 to the target system 111 (Block 420). In certain embodiments, one or more of the processes for performing the replication advantageously include executable binary(ies) injected into the source host server 102 from the replication server 124. This allows for the replication processes to be executed outside the virtual machine 104, thereby providing for a consistent and complete replication of the virtual machine data.

For instance, in certain embodiments, the failover process 400 engages in snapshot rotation to replicate the source VMDK 110 to the target datastore 116. In such embodiments, a snapshot can preferably be opened by a hypervisor of the source host server 102 prior to the issuing of the command to power down the virtual machine 104. The hypervisor snapshot can then house all the changes associated with powering down the source virtual machine 104 and putting the source data in a consistent state.

In yet other embodiments, other types of replication, migration and/or copy operations can be performed on the source VMDK 110 after the virtual machine 104 has been powered down. For example, the failover process 400 can perform differential replication, as discussed above, or the like.

At Block 425, once the replication of the virtual machine data to the target system 111 has completed, the replication server 124 issues a command to power on the target virtual machine 114. For instance, during snapshot rotation replication, the power on command can be issued once the snapshot housing all the writes accumulated during the powering off of the virtual machine 104 is closed and is ready to be merged into the source and/or target VMDKs 110, 120.

In certain embodiments, the failover process 400 can be incorporated with the replication systems and methods described herein with respect to FIGS. 1-3. Moreover, the failover process 400 can advantageously provide for a relatively fast method of replicating virtual machine data in a clean and consistent state. In yet other embodiments, the failover process 400 can be initiated automatically without receiving input from a user.

Certain embodiments of the invention disclosed herein can also advantageously avoid denial errors when accessing data of a virtual machine that, during such access, is migrated between host servers in a server cluster (e.g., via VMWARE VMOTION). That is, in certain embodiments, disclosed systems and methods can identify the location of one or more virtual machine(s) prior to initiating a copy operation that involves multiple VMDKs. For example, such copy operations can comprise one or replication or other copy operations (e.g., backup, archive or the like).

Certain embodiments of the invention provide for the tracking of movement of a virtual machine during one or more read requests of multiple VMDKs. For instance, in certain conventional systems, a shared file system allows for read access to a virtual disk A, of virtual machine A from host A. If, during the read request, virtual machine A moves to host B, the read request of virtual disk A is allowed to complete. However, if virtual machine A is also associated with a virtual disk B, a new read request cannot be successfully initiated from host A for virtual disk B.

Embodiments of the invention can use a process of connecting to a central management system of the virtual infrastructure in between each access request to a different virtual disk to inquire if the corresponding virtual machine has recently moved. If the virtual machine has moved since the last read request was initiated, the new location (e.g., host server) of the virtual machine is determined and a connection is made to the correct host machine so that a proper read/write request can be made to the additional VMDKs. Such a process could be repeated several times, for example, if the virtual machine is associated with multiple virtual disk images and can be migrated between various host servers.

Figure 5:
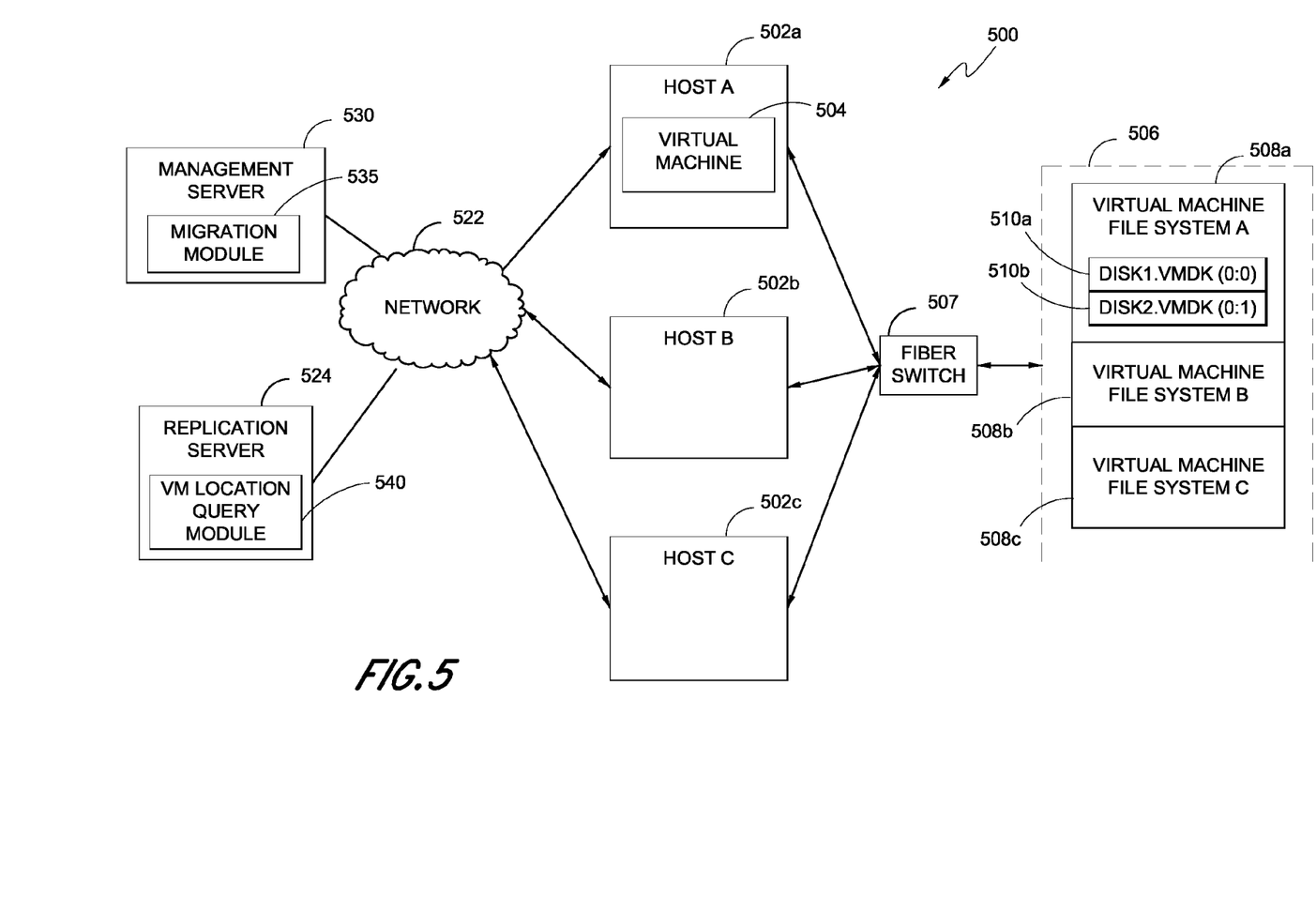
FIG. 5 illustrates an exemplary block diagram of a system that manages copy operations during migration of a virtual machine, according to certain embodiments of the invention.

FIG. 5 illustrates an exemplary block diagram of a virtual computing system 500, according to certain embodiments of the invention that accounts for migration of virtual machines. In certain embodiments, the system 500 allows for replication, backup, recovery or other data management operations on data of multiple VMDKs during movement of a corresponding virtual machine from a first to a second location, such as between host servers in a server cluster.

As shown, the system 500 includes a plurality of host computing devices (Host A 502a, Host B 502b and Host C 502c) configured to host one or more virtual machines. In particular, Host A 502a, Host B 502b and Host C 502c communicate with a datastore 506 through a fiber switch 507 to access data stored in one or more virtual machine files. For instance, the datastore 506 can comprise a SAN or like shared storage network that includes one or more VMFSs (e.g., VMFS A 508a, VMFS B 508b and VMFS C 508c) that maintain virtual disk files for each of the virtual machines on one or more of Host A 502a, Host B 502b and Host C 502c.

In certain embodiments, the datastore 506 can comprise any type of formatted logical container for holding virtual machine files and can exist on a physical storage resource, including one or more of the following: local disks (e.g., local small computer system interface (SCSI) disks of a host server), a disk array, a SAN (e.g., fiber channel), an iSCSI disk area, network attached storage (NAS) arrays, network file system (NFS), or the like. In certain embodiments, the virtual machine(s) use one or more virtual hard disks residing on the datastore 506 to store its operating system, program files and other data associated with its operations.

In certain embodiments, the VMFSs comprise a VMWARE VMFS cluster file system provided by VMware, Inc. In such embodiments, the VMFS cluster file system enables the multiple host servers with installations of ESX SERVER to have concurrent access to the same virtual machine storage and provides on-disk distributed locking to ensure that the same virtual machine is not powered on by multiple servers at the same time.

For exemplary purposes, a virtual machine 504 has been shown to be executing on Host A 502a. In certain embodiments, the virtual machine 504 comprises an operating system and associated applications, which typically operate at a user-level. That is the virtual machine 504 can access the resources of the corresponding host server 502a through the hypervisor layer. It will also be understood that additional virtual machines, though not illustrated, can execute on one or more of the depicted host computing devices.

Associated with the virtual machine 504 are two VMDKs located remote to Host A 502a on the datastore 506. In particular, virtual machine disks DISK1.VMDK 510a and DISK2.VMDK 510b are located in the VMFS A 508a and contain data that corresponds to virtual machine 504 on Host A 502a.

In certain embodiments, either or both of the VMDKs 510a,b further includes a plurality of files related to the virtual machine 504. For instance, the VMDK can include a virtual hard drive for the virtual machine 504. In certain embodiments, most of a VMDK file's content comprises the data of the virtual machine 504, while a small portion is allotted to overhead of the virtual machine 504. If the virtual machine 504 is connected directly to a physical disk, rather than to a virtual disk, the VMDK file can also store information about the partitions the particular virtual machine 504 is allowed to access.

In certain further embodiments, each of the VMDKs 510a,b includes a SCSI reservation that indicates the "owner" of the disk and relates to the location of the corresponding virtual machine 504. As an example, FIG. 5 illustrates a SCSI reservation of (0:0) for DISK1.VMDK 510a and (0:1) for DISK2.VMDK 510b, which would correspond to the current location of virtual machine 504 (e.g., which computing device is hosting the virtual machine 504). That is, in certain embodiments, the SCSI reservation for each VMDK, such as a remote VMDK, is tied to a particular host server.

The system 500 further includes a management server 530 in communication with the host servers 502a, 502b, 502c through a network 522. In certain embodiments, the management server 530 comprises a computing device that provides a single access point and/or interface for centrally managing the virtual infrastructure environment 500. In certain embodiments, the management server 530 comprises VIRTUAL-CENTER or VSERVER CENTER commercially offered by VMware Inc.

The management server 530 further includes a migration module 535 that coordinates migration of a virtual machine, or the virtual machine's memory state, from one host server to another. For instance, in certain embodiments, the migration module 535 comprises VMware VMotion technology that is configured to move an entire virtual machine from one host ESX server to another while the virtual machine is running. Since the entire state of a virtual machine is encapsulated by a set of files stored on shared storage, and certain VMFS cluster file systems allow for both source and target host ESX servers to access these virtual machine files concurrently, the active memory and precise execution state of a virtual machine can be rapidly transmitted over a high speed network. In certain embodiments, since the network is also virtualized by VMware ESX Server, the virtual machine can advantageously retain its network identity and/or connections.

In certain embodiments, the migration module 535 is configured to advantageously perform one or more of the following functions: perform live migrations with little or no downtime, undetectable to the user; continuously and/or automatically optimize virtual machines within resource pools; perform hardware maintenance without scheduling downtime and disrupting business operations; and proactively move virtual machines away from failing or underperforming host servers.

As shown, the system 500 further comprises a replication server 524 for coordinating replication operations of VMDK files 510a,b through the host server(s). In certain embodiments, the replication server 524 comprises a WINDOWS-based server or the like.

The replication server 524 further comprises a virtual machine query module 540 for determining the current location of a virtual machine prior to performing replication of each VMDK associated with the virtual machine. In certain embodiments, the query module 540 communicates with the management server 530 to determine the most current SCSI reservation for the VMDK and/or server hosting the particular virtual machine.

As shown, the network 522 provides a wired and/or wireless communication medium between the hosts 502a, 502b, 502c, the management server 530 and/or the replication server 524. In certain embodiments the network 126 can comprise a LAN. In yet other embodiments, the network can comprise one or more of the following: internet, intranet, WAN, public network, combinations of the same or the like. In addition, connectivity to the network 126 may be through, for example, remote modem, Ethernet, token ring, FDDI, ATM, combinations of the same or the like.

Figure 6:
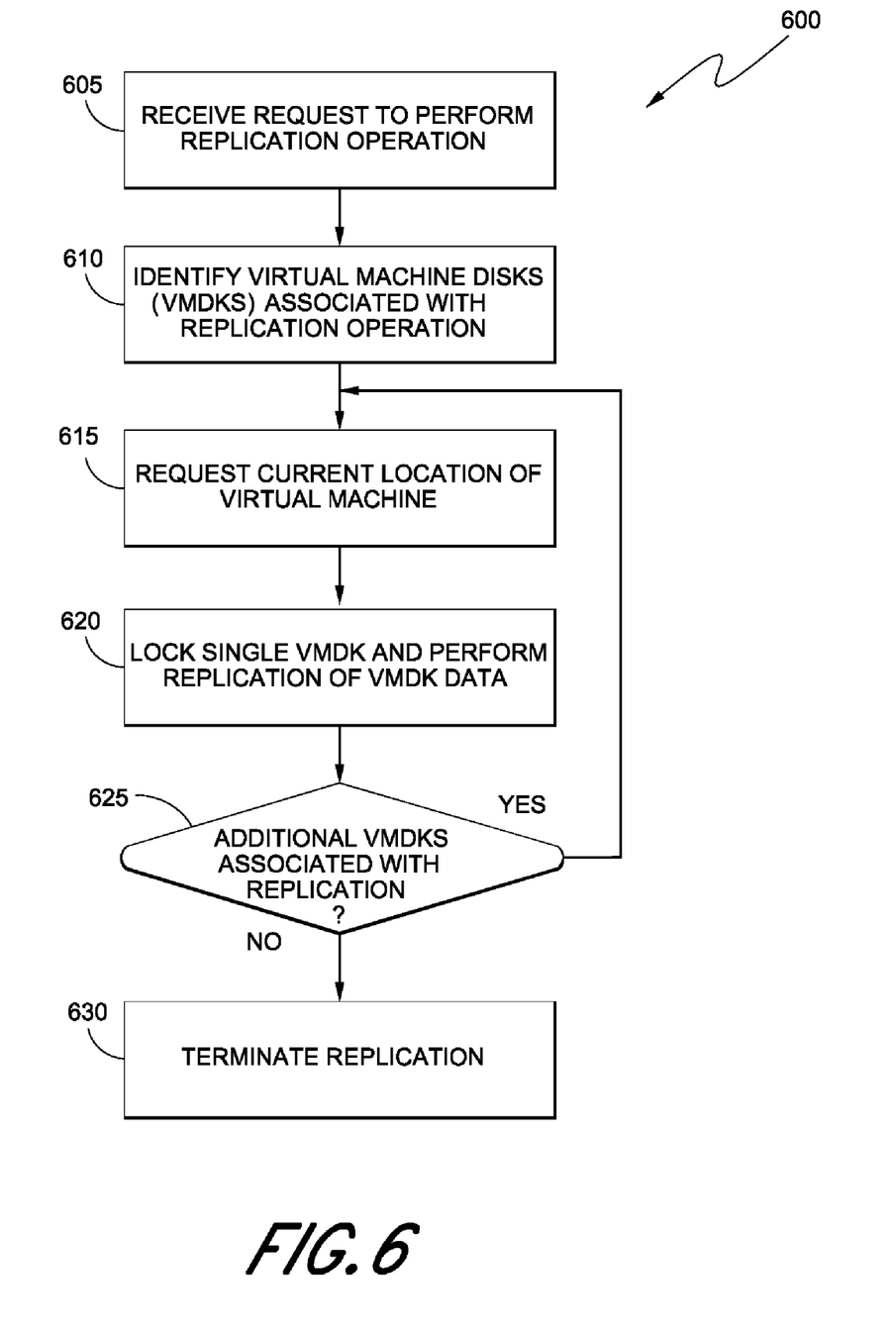
FIG. 6 illustrates a flowchart of an exemplary embodiment of a replication process usable by the replication system of FIG. 5 during migration of the virtual machine.

FIG. 6 illustrates an exemplary flowchart of a replication process 600, according to certain embodiments of the invention. In certain embodiments, the replication process 600 allows for replication of virtual machine data on one or more VMDKs notwithstanding migration of a corresponding virtual machine during the replication process. For exemplary purposes, the process 600 will be described with reference to the components of the virtual computing system 500 of FIG. 5.

The process 600 begins with Block 605, wherein the replication server 524 receives a request, or command, to perform replication of virtual machine data. In certain embodiments, the request concerns the replication of all data of a virtual machine, such as multiple VMDKs associated with the virtual machine. In yet other embodiments, the request may concern replication of only a portion of the data associated with the virtual machine(s). For instance, the replication request can be based on one or more job schedules, user preferences, policies, rules or the like. Moreover, in certain embodiments, the replication request can specify the location of the virtual machine to be backed up.

At Block 610, the replication server 524 identifies the VMDKs that are the subject of the replication request. In certain embodiments, the VMDKs are located on a storage device (e.g., datastore 506) that is remote to the server hosting the virtual machine (e.g., Host A 502a hosting virtual machine 504). In certain further embodiments, the storage device comprises a shared storage device including multiple VMFSs associated with a plurality of virtual machines on one or more host servers.

For exemplary purposes, the remainder of the replication process 600 will be described with particular reference to virtual machine 504 and DISK1.VMDK (VMDK 510a) and DISK2.VMDK (VMDK 510b) on VMFS A 508a.

At Block 615, the replication server 524 determines the current location of the virtual machine 504. For replication of data on a first VMDK, this location can be determined from the replication request. For additional VMDKs associated with the replication request (as discussed in more detail below with respect to Block 625), determining the location of each additional VMDK comprises the query module 540 issuing an API call to the management server 530 (e.g., a management layer of VirtualCenter) for information regarding which computing device is currently hosting the virtual machine 504. In other embodiments, the request can comprise a request for the SCSI reservation of the VMDK 510a, which identifies the current location of the virtual machine 504.

After determining the current location of the virtual machine 504, the replication server 524 locks the VMDK 510a and performs replication of the VMDK data (Block 620). In certain embodiments, where the replication server 524 is coupled to the host servers via the network 522, the replication server 524 performs such replication through the particular server hosting the virtual machine 504 (i.e., Host A 510a).

After completing replication of the VMDK 510a, the process 600 determines if there are additional VMDKs associated with the replication request (Block 625). If so, the replication process 600 returns to Block 615. At that point, the replication server 524 again requests the current location of the virtual machine 504. One reason for such a request is to address the possibility that the virtual machine 504 migrated during replication of the VMDK 510a. In such situations, if the replication server 524 were to attempt to perform replication of the VMDK 510b through Host A 502a (i.e., the host of the virtual machine 504 at the time replication of VMDK 510a commenced), and the virtual machine 504 had been migrated to another host server (e.g., Host B 502b), an "access denied" error would be generated because Host A would no longer have read and/or write access to VMDK 510b. Thus, repeating Block 615 prior to the replication of each VMDK can ensure that the replication server 524 will attempt replication of the particular VMDK via the correct host server, thereby avoiding access denial errors.

If at Block 625 no additional VMDKs are associated with the replication request, the process 600 terminates replication (Block 630).

Although the replication process 600 has been described with reference to particular arrangements, other embodiments of the invention can perform the process 600 in different ways. For example, in certain embodiments, the management server 530 identifies the VMDKs and/or virtual machine associated with a particular replication request. In yet other embodiments, the replication of at least two VMDKs can be performed concurrently, or at least partially concurrently, rather than in a serial format.

Although embodiments of the invention described with reference to FIGS. 4-6 have been disclosed with particular reference to replication operations, it will be understood that such systems and methods can be utilized with various types of copy operations including, for example, backup, archive, migration, recovery and/or other copy operations in addition to, or in place of, replication operations. For instance, embodiments of the invention can be used with the VRANGER PRO backup tool commercially available through Vizioncore, Inc. (Buffalo Grove, Ill.). Moreover, backup operations that can be utilized with such embodiments of the invention are further described in U.S. patent application Ser. No. 12/182,364, filed Jul. 30, 2008, and U.S. patent application Ser. No. 12/502,052, entitled "Backup System and Methods for a Virtual Computing Environment," filed on even date herewith, each of which is hereby incorporated herein by reference in its entirety to be considered part of this specification.

Furthermore, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for replicating virtual machine data, the method comprising:
    creating a first snapshot of one or more source virtual machine disks on a source storage device, wherein the one or more source virtual machine disks comprises a plurality of source data blocks;
    detecting an out-of-sync condition between the one or more source virtual machine disks and one or more replicated virtual machine disks, the one or more replicated virtual machine disks comprising a plurality of target data blocks corresponding to the plurality of source data blocks;
    following said detecting, generating a target signature for each of the plurality of target data blocks of the one or more replicated virtual machine disks, wherein each target signature is indicative of data content of a particular target data block;
    storing each target signature in a target signature file;
    for each of the plurality of source data blocks,
        generating a source signature indicative of data content of a particular source data block,
        comparing the source signature of the particular source data block with the target signature of the corresponding target data block, and
        updating the one or more replicated virtual machine disks with a copy of the particular source data block when the source signature does not match the target signature;
    creating a second snapshot of the one or more source virtual machine disks; and
    committing the first snapshot to both the one or more source virtual machine disks and the one or more replicated virtual machine disks.

2. The method of claim 1, wherein said detecting the out-of-sync condition comprises at least one of:
    detecting that the first snapshot was deleted;
    detecting that the first snapshot was partially committed to either of the one or more source or replicated virtual machine disks; and
    detecting that a target virtual machine associated with the one or more replicated virtual machine disks was powered on.

3. The method of claim 1, wherein said generating the source and target signatures comprises performing a cryptographic hash function on, respectively, the source and target data blocks.

4. The method of claim 3, wherein the source and target signatures comprise MD4 signatures.

5. The method of claim 1, following said committing the first snapshot, repeating alternating acts of creating a new snapshot of the one or more source virtual machine disks and committing a previously existing snapshot to both the one or more source and replicated virtual machine disks until a second out-of-sync condition between the one or more source virtual machine disks and the one or more replicated virtual machine disks is detected.

6. The method of claim 1, wherein the source and target data blocks comprise 256 KB blocks.

7. The method of claim 1, wherein the one or more source virtual machine disks comprises first and second virtual machine disks, the method additionally comprising requesting a location of the second virtual machine disk prior to creating the first snapshot of the second virtual machine disk.

8. The method of claim 7, additionally comprising requesting a location of the first virtual machine disk prior to creating the first snapshot of the first virtual machine disk.

9. The method of claim 1, additionally comprising storing in an undo file overwritten target data blocks of the one or more replicated virtual machine disks resulting from said act of updating.

10. A method for replicating virtual machine data, the method comprising:
copying data from a source virtual machine disk to a target virtual machine disk by repeatedly alternating acts of (i) creating a new snapshot of the source virtual machine disk and (ii) committing a previously existing snapshot of the source virtual machine disk to both the source and target virtual machine disks until an out-of-sync condition is detected between the source and target virtual machine disks, the new snapshot capturing data modifications intended to be made to the source virtual machine disk during said committing;
creating a second snapshot of the source virtual machine disk;
comparing a source signature for each of a plurality of source data blocks of the source virtual machine disk with a target signature of a corresponding target data block of the target virtual machine disk;
updating the target virtual machine disk with a copy of each source data block whose source signature does not match the target signature of the corresponding target data block;
creating a third snapshot of the source virtual machine disk; and
committing the second snapshot to both the source and target virtual machine disks, wherein the second snapshot captures data modifications intended to be made to the source virtual machine disk during said comparing and updating.

11. The method of claim 10, further comprising generating the source signature for each of the plurality of source data blocks.

12. The method of claim 11, wherein said comparing comprises comparing the source signature of each source data block immediately following said generating of the source signature of the source data block.

13. The method of claim 12, further comprising generating the target signatures of the target data blocks and storing the target signatures in a signature file prior to said comparing.

14. A system for replicating virtual machine data, the system comprising:
a source system comprising,
a source virtual machine executing on a source host server,
a source datastore in communication with the source virtual machine, and
a source virtual machine disk stored on the source datastore and comprising data of the source virtual machine as a plurality of first data blocks;
a target system comprising,
a target datastore, and
a target virtual machine disk stored on the target datastore and comprising data of a target virtual machine as a plurality of second data blocks; and
a replication module in network communication with the source system and the target system to replicate data from the source virtual machine disk to the target virtual machine disk, wherein the replication module is further programmed to,
repeat acts of instructing a creation of a new snapshot of the source virtual machine disk and instructing a commit of a previously existing snapshot to both the source and target virtual machine disks until an out-of-sync condition is detected between the source and target virtual machine disks, and
following detecting of the out-of-sync condition,
compare first signatures for each of the plurality of first data blocks with second signatures of corresponding ones of the plurality of second data blocks to identify unmatched data blocks between the source and target virtual machine disks, and
update the target virtual machine disk with a copy of each first data block that does not match the corresponding second data block.

15. The system of claim 14, wherein the replication module comprises a differential module configured to generate the first and second signatures of each of, respectively, the plurality of first and second data blocks.

16. The system of claim 15, wherein the replication module is further configured to load the differential module onto the source host server via binary injection.

17. The system of claim 14, wherein the first and second signatures comprise hash values.

18. The system of claim 14, wherein the replication module further comprises a query module programmed to identify a location of the source virtual machine prior to replicating the data of the source virtual machine disk.

19. The system of claim 14, wherein the new snapshots and the preexisting snapshots comprise hypervisor snapshots.

20. A system for replicating virtual machine data, the system comprising:
means for creating a first snapshot of one or more source virtual machine disks on a source storage device, wherein the one or more source virtual machine disks comprises a plurality of source data blocks;
means for detecting an out-of-sync condition between the one or more source virtual machine disks and one or more replicated virtual machine disks, the one or more replicated virtual machine disks comprising a plurality of target data blocks corresponding to the plurality of source data blocks;
means for generating a target signature for each of the plurality of target data blocks of the one or more replicated virtual machine disks, wherein each target signature is indicative of data content of the corresponding target data block, wherein said generating means is further configured to generate a source signature for each of the plurality of source data blocks;
means for comparing the source signature of each source data block with the target signature of the corresponding target data block;
means for updating the one or more replicated virtual machine disks with a copy of the source data block when the source signature of the source data block does not match the target signature of the corresponding target data block; and
means for committing the first snapshot to both the one or more source and replicated virtual machine disks.

* * * * *